W. H. EDGECOMB.
EMERGENCY TRACK FOR MOTOR VEHICLES.
APPLICATION FILED MAY 3, 1922.

1,432,447. Patented Oct. 17, 1922.

W. H. Edgecomb Inventor

Patented Oct. 17, 1922.

1,432,447

UNITED STATES PATENT OFFICE.

WILLIAM H. EDGECOMB, OF LUBEC, MAINE, ASSIGNOR OF ONE-HALF TO MILLARD C. EDGECOMB, OF LUBEC, MAINE.

EMERGENCY TRACK FOR MOTOR VEHICLES.

Application filed May 3, 1922. Serial No. 558,221.

*To all whom it may concern:*

Be it known that I, WILLIAM H. EDGECOMB, a citizen of the United States, residing at Lubec, in the county of Washington and State of Maine, have invented a new and useful Emergency Track for Motor Vehicles, of which the following is a specification.

This invention relates to an emergency track for use in connection with motor vehicles for the purpose of facilitating the removal of a vehicle from a mud hole, sand, etc.

One of the objects of the invention is to provide a simple, durable and efficient structure of this character the parts of which can be assembled readily and easily taken apart so that when the device is not in use it can be stored away in a small space.

A further object is to provide a track the wheel supporting elements of which will adjust themselves automatically to the wheels so as to give the proper bearings therefor.

Another object is to provide an emergency track the parts of which will not become accidentally separated while in use.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1:
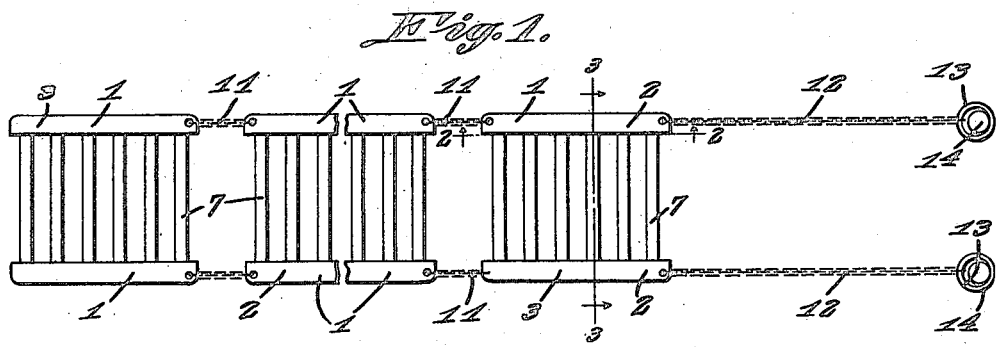
Figure 1 is a plan view of the track.
Figure 2:
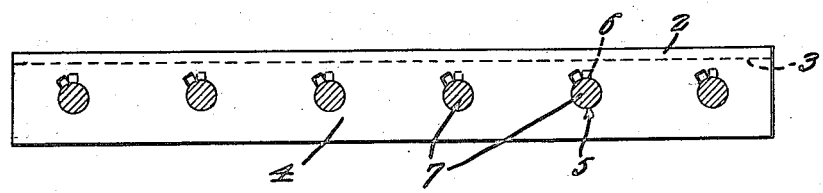
Figure 2 is an enlarged section on line 2—2, Figure 1.
Figure 3:
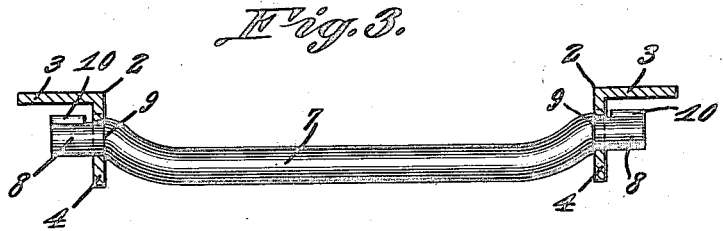
Figure 3 is an enlarged section on line 3—3, Figure 1.

Referring to the figures by characters of reference 1, designates a unit of the track, it being understood that any desired number of these units can be employed, all of them being of the same construction. Each unit includes parallel angle strips 2 having laterally extending top flanges 3 while the inner downwardly extending flanges 4 are provided with regularly spaced openings 5 each of which has a radial notch 6 in the upper portion of the wall thereof.

Connecting the side strips 2 of each unit are cross rods 7 each of which has its ends in alignment but offset from the intermediate portion of the rod. These end portions 8 are reduced in diameter so as to provide a shoulder or abutment 9 at the inner end of each end portion. A longitudinal projection or key 10 is formed on each end portion 8 and is so proportioned as to be insertible longitudinally through a notch 6.

As before stated any desired number of these units may be used. The units are adapted to be placed in alignment and short chains 11 or the like are provided for connecting the side strips of one unit to the side strips of the next adjoining unit. Anchoring chains 12 are adapted to be secured to the front ends of the first unit and may be formed with terminal rings 13 adapted to receive anchoring stakes 14.

Under normal conditions the apparatus is knocked down or, in other words, has the rods 7 detached from the side strips 2. Thus the structure can be stored in a small space. When it is desired to use the track the rods are inserted into the openings 5, the keys or projections 10 being passed through the notches 6. This is only permissible while the intermediate portions of the rods 7 are out of their lowermost or normal positions. By then turning the rods so as to move the keys or projections 10 out of alignment with the notches 6 the parts will be securely fastened together. The track can then be laid on the ground at the point where it is to be used and the chains 12 extended forwardly therefrom and anchored by means of the stakes 14 or in any other manner desired. When the wheels of the vehicle pass over the track the intermediate portions 7 of the rods will swing to adjust themselves to the wheels and these rods, as well as the laterally extending flanges 3 of the side strips 2, will provide sufficient bearing surface to cause the track to present a firm bearing for the wheels and provide the necessary traction to enable the vehicle to travel forwardly along the track. Obviously one of these tracks is to be provided for the wheels of each side of the vehicle.

What is claimed is:—

1. A device of the class described including a plurality of flexibly connected units, each unit comprising side angle strips, cross rods rotatably mounted within and connecting the angle strips, and cooperating means upon the rods and side strips for holding them assembled.

2. A device of the class described including a plurality of flexibly connected units, each unit consisting of side strips having openings therein, cross rods having aligning ends offset from the intermediate portions of the rods and insertible into the openings in opposed strips, while the rods are out of their normal positions, and cooperating means upon the rods and side strips for holding them assembled while the rods are in normal positions.

3. A device of the class described including flexibly connected units, each unit comprising parallel oppositely disposed angle strips having openings therein, there being a notch within the wall of each opening, rods having their end portions offset but in alignment, said end portions being reduced to provide shoulders, the end portions of the rods being insertible through the openings to position the shoulders close to the side strips, projections on the end portions of the rods insertible through the notches when the rods are located out of their normal positions, said rods when in normal positions being held assembled with the side strips by the projections.

4. A device of the class described including a plurality of flexibly connected units, each unit comprising parallel side strips having openings therein, rods each having its end portions offset from the intermediate portion but disposed in alignment, there being projections on the offset portions of the rods, said rods when rotated out of normal positions, being insertible at their end portions into the openings in the side strips, the projections on the end portions cooperating with the side strips to hold the rods and side strips assembled when the rods are rotated back to their normal positions, flexible anchoring devices extending from one of the units.

In testimony that I claim the foregoing as my own, I have hereto affixed my signature in the presence of two witnesses.

WILLIAM H. EDGECOMB.

Witnesses:
J. A. MORGAN,
B. B. REYNOLDS.